United States Patent [19]
Winterowd et al.

[11] Patent Number: 5,993,534
[45] Date of Patent: Nov. 30, 1999

[54] STAIN BLOCKING TREATMENT FOR WOOD BASED PANELS

[75] Inventors: Jack G. Winterowd; Dan V. Hanson, both of Puyallup, Wash.; Jerry D. Izan; Charles E. Lewis, both of Federal Way, Wash.; Stephen L. Siebert, Lee's Summit, Mo.; Kerry P. Murphy; David R. Pflum, both of Rosscommon, Mich.; Barbara A. Wade, Grayling, Mich.

[73] Assignee: Weyerhaeuser Company, Tacoma, Wash.

[21] Appl. No.: 08/948,454

[22] Filed: Oct. 9, 1997

Related U.S. Application Data

[63] Continuation-in-part of application No. 08/675,017, Jul. 3, 1996, abandoned.

[51] Int. Cl.$^6$ .................................................. C09D 5/00
[52] U.S. Cl. ..................... 106/461; 106/15.05; 106/34; 106/471; 524/436
[58] Field of Search ........................ 106/15.05, 461, 106/471, 34; 524/436

[56] References Cited

U.S. PATENT DOCUMENTS

| | | | |
|---|---|---|---|
| 3,900,620 | 8/1975 | Gilman et al. | 427/408 |
| 4,021,398 | 5/1977 | Gilman et al. | 524/437 |
| 4,218,516 | 8/1980 | Meyer et al. | 428/537 |
| 5,312,863 | 5/1994 | Van Rheenen et al. | 524/555 |
| 5,320,872 | 6/1994 | McNeel et al. | 427/393 |
| 5,460,644 | 10/1995 | Thomassen | 106/18.36 |
| 5,527,619 | 6/1996 | Rokowski et al. | 428/452 |
| 5,529,811 | 6/1996 | Sinko | 427/440 |

*Primary Examiner*—Anthony Green

[57] ABSTRACT

Wood-based products, to which an overlay material is attached, are pretreated with an aqueous suspension of alkaline, inorganic, multivalent compound such as magnesium hydroxide and a binding agent and then allowed to dry fixing the antistaining compound on the surface of the wood member. Selected additives can be added to the aqueous suspension to enhance application and surface properties. Thereafter the treated members are installed, a typical application being as wood-based underlayment or structural subflooring in flooring construction. When a vinyl floor covering material is attached to the pretreated panel, the treatment functions as a stain blocker preventing unsightly staining of the vinyl floor covering over time.

11 Claims, No Drawings

STAIN BLOCKING TREATMENT FOR WOOD BASED PANELS

CROSS REFERENCE TO RELATED APPLICATION

This application is a continuation-in-part of U.S. patent application Ser. No. 08/675,017 filed on Jul. 3, 1996 and now abandoned.

BACKGROUND OF THE INVENTION

This invention relates generally to an antistaining coating formulation; a process for applying the formulation to a wood based substrate; and the resulting coated product which does not stain overlays that are attached to the coated product. Wood-based substrates which are suitable for this application include oriented strandboard, particleboard, plywood, fiberboard and solid-sawn lumber. Wood-based substrates which contain a significant concentration of extractable staining compounds are especially relevant to this invention. Overlays which could be used in conjunction with this invention include decorative coatings such as paints, and floor covering materials such as vinyl floor sheathing. Overlays that are placed in contact with wood based substrates are often stained by extractives from the wood, but the coated wood based substrates as treated according to the teachings of this invention are highly resistant to such staining.

Underlayment panels are installed on top of the structural subfloor and just beneath decorative floor coverings such as vinyl. The primary purpose of the underlayment is to act as a smooth, stable and uniformly thick substrate to which the decorative floor coverings are attached. The structural and other properties of oriented strandboard, particleboard and plywood, which are all currently used as underlayment panels, have generally been found to meet the underlayment application requirements, although all of these have stained vinyl floor coverings under adverse conditions of relatively high moisture content and high temperatures. After the wood-based underlayment is installed, a common product which is adhesively bonded or otherwise attached to the exposed strand surface layer is a vinyl floor covering. Many vinyl floor covering products are commercially available with one well known producer of a line of vinyl floor products being Armstrong World Industries, Inc. of Lancaster, Pa. Many suitable fill spread adhesives are commercially available materials commonly used to attach the vinyl floor covering to the wood surface. Other vinyl floor covering attachment means are perimeter adhesives and mechanical fasteners such as staples.

When vinyl floor covering is installed on top of oriented strandboard underlayment, there is a tendency for strand-shaped dark stains to develop on the upper surface of the vinyl 3–24 months after installation. Such staining is undesirable. Although the mechanism of stain formation is not clearly understood, there is a suspicion that over time under warm, humid conditions, water soluble compounds in the wood diffuse into the vinyl floor covering where some of them react with chemicals in the vinyl floor covering such as residual azodicarbonamide, which is a common blowing agent used in the manufacture of vinyl floor coverings. Some portion of the reaction products are probably intensely colored, and these manifest themselves as "stains." This staining action does not occur when azodicarbonamide is omitted from the vinyl floor sheathing formulation. Furthermore, certain vinyl floor covering products are more susceptible to staining than others. Thinner vinyl floor covering products develop these stains more readily than do thicker ones. The stains seem to develop most rapidly in hot, moist environments.

Other researchers have observed that this staining action can be prevented or "blocked" by placing a sheet of aluminum foil between the wood strand surface and the vinyl covering. Presumably the wood extractives are insoluble in the aluminum and thus are unable to migrate into the vinyl floor covering. Unfortunately, the aluminum is easily torn or punctured and the conventional adhesives used to secure the vinyl floor covering to the wood surface are not compatible with the aluminum. Other researchers have found that the aluminum fails to prevent staining when the surface of the aluminum is punctured or otherwise interrupted. Also, the aluminum foil is relatively expensive. Other total barrier coatings have similar problems and have proven to be less effective than aluminum foil at stain blocking.

It is also recognized that some commercially available patching compounds which contain high levels of Portland cement can be used as stain blocking coatings. Examples of such patching compounds include the MAPEI PLANI/PATCH roduced by MAPEI, INC., Montreal, PQ, Canada and Ardex Feather-Finish Cement roduced by Ardex, Inc. of Coraopolis, Pa. Although it is inconvenient to do so, these materials can be mixed with water or latex and trowelled onto the top surface of the underlayment at a residential house construction site. Installers must wait for the coating to set prior to installing the vinyl floor sheathing. This method is effective for preventing vinyl floor stains and it is practiced by some informed installers. We have discovered through experimentation that there is a minimum application load level that is required for effective stain blocking. At these loading levels the cost of the treatment is substantial. The short cure time of the cement makes these materials difficult to apply in a continuous process production line at a panel manufacturing site. Such an operation would require on-site mixing and sophisticated and complex process controls in order to avoid the risk of premature curing of the cement in the applicator equipment. On-site cleanup of cured cement is extremely difficult, time consuming and labor intensive.

The present discovery is that the staining action can be blocked very effectively over time without adversely affecting the vinyl adhesive bond by pretreating the top surface of the wood based surface with an aqueous suspension of an alkaline, inorganic, multivalent compound such as magnesium hydroxide. Included is a pigment to give the coating a preselected color and a binding agent to fix the stain blocking agent and pigment to the wood.

The preferred formulation has a shelf life of greater than 6 months which allows it to be manufactured off-site and then shipped to a panel manufacturing facility.

It is suspected that key wood extractives are precipitated or gelled or otherwise immobilized or made inert by the magnesium ions present in the preferred formulation. This coating has the advantages of being inexpensive, non-toxic, colored, stable with a long shelf life, compatible/receptive to vinyl adhesives and patching compounds and it will not fail if the coating is punctured. Formulations can be prepared which dry rapidly subsequent to application. We have found that as long as the spread rate of the coating is maintained below a certain threshold level, freshly coated panels can be stacked on top of each other with as little as 5 seconds of drying time under ambient conditions prior to stacking. Even when hundreds of these panels are stacked on top of each other with only minimum drying time, severe bonding between contacting, freshly coated panels is not observed. Selecting the proper binding agent and level of the binding agent are also critical to the success of avoiding bonding between stacked panels.

While it is possible to thoroughly dry the applied coating prior to stacking the coated panels, the use of a dryer, such as a forced-air oven, has many disadvantages relative to stacking the panels while they are still wet. High temperature dryers are expensive and they require relatively long sections of production line space. Dryers are also energy intensive. A dryer will heat at least a portion of the wood as well as the applied coating, and it is well known that heating wood generates volatile organic compounds (VOC's) which would need to be treated with some sort of pollution abatement equipment. We have also found that the top surface of a coated panel is more smooth when it is stacked wet than it is if it is dried prior to stacking.

The preferred manufacturing process for this coated underlayment entails coating the major faces of the flooring panels that will directly contact the vinyl floor coverings with the stain-blocker formulation; grading the coated panels; accumulating the coated panels for a period of about 30 seconds to 2 minutes; stacking the coated panels into units; packaging the units; and stacking units on top of units for storage.

One of the features desired by the building industry is for a product to arrive at a building site pretreated so on-site processes are minimized. The present invention includes application of the aqueous suspension of the preferred magnesium hydroxide and other additives at the manufacturing plant where it can be done on-line at relatively high speeds.

Upon arrival at a building site each pretreated panel will be ready for installation as a flooring underlayment panel. With the treated surface facing upwardly each panel will be fixed in place and thereafter the vinyl floor covering will be attached to the treated underlayment.

Accordingly, from the foregoing, the primary object of the present invention is the prevention of unwanted stains on overlays bonded to wood based substrates.

Another object is to provide a stain preventing application process that is performed prior to the point in time that the panels are shipped for sale into the distribution system.

Yet another object is to provide such a process that is a pretreatment coating process capable of being applied at high speeds.

Still a further object is to provide a stain prevention process and resulting product that is safe for the production workers and the environment.

Still a further object is to provide a pretreated wood-based panel product where the pretreating stain prevention compound will not adversely affect the overlay bonding mechanism over time.

Additionally, another object of the present invention is the provide a liquid stain blocking formulation that can be applied to any wood-based product, such as cedar lumber, and thereby prevents extractives in the cedar from migrating into top coats of paint which could be discolored by the staining compounds.

These and other objects of the invention will become more apparent upon reading the specification to follow.

SUMMARY OF THE INVENTION

Briefly stated the present invention is practiced in one form by coating a wood-based product on at least one exposed surface with an aqueous suspension of an alkaline inorganic, multivalent compound such as magnesium hydroxide and thereafter allowing the coated surface to dry. An overlay material such as a vinyl floor covering is then attached to the pretreated substrate surface. The inorganic, multivalent compound prevents unsightly stains from developing in the overlay material.

DETAILED DESCRIPTION OF THE PREFERRED EMBODIMENT

The present invention includes a wood-based member which becomes a substrate when a suitable overlay material, such as commercially available vinyl floor covering, is adhesively or otherwise bonded thereto. Particular wood-based members could be oriented strand panels, plywood panels, and the like, all well known and commercially available from a number of producers, including the assignee of the present invention.

More particularly, as ¼" wood-based panels were being used in moist climates as flooring underlayment and having overlay sheathing products adhesively bonded thereto to create a durable, long wearing floor surface, a staining issue became apparent. It is believed that after installation the moist environment causes certain chemical compounds in the underlying wood to migrate into the vinyl floor covering resulting in unwanted staining.

A preferred embodiment includes treating the wood-based panels at their manufacturing site with an aqueous formulation, including the antistaining agent, which is an alkaline, inorganic, multivalent compound such as magnesium hydroxide. The surface of the panel which will be the upper surface in an underlayment application will be the treated surface.

Directly after the formulation is applied, preferably in-line and by a suitable, commercially available roll coater and most preferably a reverse roll filling machine, the wet panels are loaded into an accumulator which provides an additional 30 seconds to 2 minutes of drying time under ambient conditions. The treated panels are then stacked into normally sized units and the applied formulation is allowed to dry, usually for a period of several hours. Drying time is long enough for excess water to absorb into the wood, to condition the treated surfaces, and to fix the antistaining agent within the top surface of the panel.

At the installation site the treated panels are incorporated into the structure being built and each panel will be installed with the treated surface facing up. Thereafter, the vinyl floor covering material can be installed directly on top of the treated panels. When using vinyl floor covering, the normal attachment methods which may include commercially available adhesives (compatible with the treated underlayment and surface), may be used. Thereafter, if the proper combination of temperature and humidity occur over a time, normally sufficient to cause staining, the antistaining agent present in the top surface of the wood-based underlayment will inhibit the development of unsightly stains in the vinyl floor covering.

In preparing the aqueous formulation containing the antistaining agent additional additives can include a viscosifying agent, a binding agent and a pigment. The purpose of the binding agent is to secure all of the solid, suspended particles in the antistaining formulation to the substrate. Suitable binding agents could include latices; such as acrylic latex, a styrene-butadiene latex, or a polyvinyl acetate latex; soluble polysaccharides, such as starch, alginic acid or guar gum; or phenoplast resins, such as phenol-formaldehyde resin or phenol-resorcinol-formaldehyde resin; or aminoplast resins, such as urea-formaldehyde resin or melamine-formaldehyde resin. In addition to magnesium hydroxide, other suitable anti-staining agents have been found to be sodium borate and magnesium oxide. However, concentrated aqueous solutions of sodium borate or suspensions of magnesium oxide will solidify in a matter of days or weeks. While these alternative materials are highly effective stain blocking agents, formulations based on them have less shelf life than formulations based on $Mg(OH)_2$. Thus, these formulations could require on-site mixing at the manufacturing facility, which is a disadvantage. We have also observed that some of the vinyl adhesives are not compatible with the sodium borate. To prepare the preferred formulation an aqueous suspension is prepared with the following constituents:

| Component | Parts |
|---|---|
| Water | 15–40 |
| Antistaining agent (magnesium hydroxide preferred) | 5–45 |
| Viscosifying agent (Avicel preferred) | 0–4 |
| Binding Agent (styrene-butadiene preferred) | 5–50 |
| Pigment (preselected color of choice) | 0–6 |

The magnesium hydroxide suspension will preferably be roll coated onto the top surface of the panel and will be applied to create a loading level for the antistaining agent of from about 5 grams to about 15 grams per square foot of panel surface area. We have found that a reverse roll filling machine such as that produced by the Black Brothers Co., Mendota, Ill. is particularly suitable for this purpose.

A preferred commercial manufacturing process includes the following steps:

1) roll coat stain blocking formulation to top side of panel 2) visual inspection of each coating and rejection of low quality panels 3) partially dry panels—transfer panels into a stacker 4) create units of stacked coated panels—packaging 5) storage—(units stacked on units)

Thus, what has been described is an effective stain blocking formulation and an easy method for its application to wood-based panel products. With selected additives the panel surface treated with the antistaining agent can be improved. The components utilized and the application method are environmentally safe.

EXAMPLE 1

A preferred stain blocking formulation was prepared by dispersing Avicel, type RCN-30 from the FMC Corp. [Philadelphia, Pa.] (18 parts by weight), in water (199.5 parts by weight) in a high shear blender for a period of 30 minutes. A diarylide yellow pigment dispersion (2.0 parts by weight), a phthalo blue pigment dispersion (0.2 parts by weight), a carbon black pigment dispersion (0.3 parts by weight) and titanium dioxide powder (40 parts by weight) were added with continued mixing for a 5 minute period. A carboxylated styrene-butadiene latex, known as Tylac 97422-00 from Reichhold Chemicals, Inc. [Dover, Del.] (400 parts by weight), was added with continued mixing for a 5 minute period. A polyvinyl chloride powder, type 179 from The Geon Co. [Cleveland, Ohio] (40 parts by weight) was then added with continued stirring for a 5 minute period. Magnesium hydroxide powder, known as MagChem MH10 from Martin Marietta Magnesia Specialties, Inc. [Baltimore, Md.] (300 parts by weight), was then added to the batch with continued stirring for a 5 minute period.

This formulation initially had a viscosity of 22,400 cp at a temperature of 25° C. as measured by use of a Brookfield viscometer (#5 spindle, 2.5 rpm). Samples of this formulation were stored at a temperature of 20° C. for a period of 8 weeks and viscosity measurements were repeated at weekly intervals. Throughout the duration of this shelf-life test the maximum viscosity value was 24,000 cp and the minimum was 22,600 cp. A similar shelf-life test was conducted in which samples were stored in an environment in which the temperature was 40° C. The viscosity of the formulation after being stored at this elevated temperature for 8 weeks was 28,600 cp. Another shelf-life test was conducted in which samples of this formulation were subjected to a temperature schedule which cycled between 20° C. and −20° C. five times over a three week period. At the end of this test the viscosity of the formulation was 31,200 cp. Samples of this formulation stored in a closed container at a temperature of 20° C. for a four month period exhibited no settling of suspended solids and almost imperceptible liquid phase separation (a very thin film of water spontaneously forms on top of the remainder of the formulation). The slight degree of liquid phase separation was easily remedied by briefly agitating the formulation. Thus, this particular formulation had excellent shelf-life stability at room temperature and it was reasonably stable under relatively extreme temperature conditions.

This formulation had a rheology that was highly thixotropic, which made it highly suitable for a roll coating application. The formulation (500 lb.) was prepared at one manufacturing site and packaged in a 55 gallon-size barrel and shipped about 1000 miles via a temperature-controlled freight truck to a second manufacturing site. The barrel was stored at the second site at a temperature of 15° C. for a 1-week period. The barrel was then opened and the formulation was inspected. A very thin film of water covered most of the top surface of the formulation. No settling of suspended solids was observed. A propeller attached to a long shaft, which was driven by an electric power drill, was inserted into the barrel and the formulation was agitated for about two minutes which appeared to homogenize the mixture. An air-driven, 2:1 ratio, piston displacement pump from Graco [Minneapolis, Minn.] was inserted into the barrel and used to pump the formulation through a rubber hose (¾" inner diameter) into the reservoir of a reverse roll filling machine (RRFM) from the Black Brothers Co. [Mendota, Ill.]. A unit of ¼" thick OSB underlayment panels (4'×8') (based on aspen, maple and pine wood strands) from the Weyerhaeuser Company [Tacoma, Wash.] was singulated and each panel was fed into the RRFM at a line speed of 100 lineal ft./min. The direct coating roll n the RRFM had a durometer value of 60 (Shore) and was contoured with 16 threads per lateral inch. The nip settings on the RRFM were adjusted to achieve a spread rate of 11 g/sq. ft. The applied coating was uniformly distributed across the top surface of the panels. The freshly coated panels were transported to a stacking station by use of a conveyor. The residence time of each coated panel on the conveyor ranged between 40 and 80 seconds. At the stacking station each panel was visually inspected and reject panels were discarded. Acceptable panels were gently placed on top of each other without scraping or grossly disturbing the applied coating. Units of coated panels (a stack of 95 panels) were wrapped with decorative paperboard and secured with steel bands. Finished units were stacked on top of each other as they were prepared. The applied coating continued to dry and equilibrate in these units for several days. Some of the units were then disassembled for evaluation.

Individual panels were easily separated from one another and the coating was dry and smooth to the touch. Interestingly, a variety of strand-shaped stains were visible in the applied coating. The color and intensity of these stains were deemed to be aesthetically acceptable in combination with the sea-green color of the non-stained portion of the formulation. No unusual odors were observed.

Common, commercially available adhesives, which are typically used to adhere vinyl floor sheathing to wood based underlayment panels, were applied by use of trowels to the coated surface of the underlayment panels. These adhesives included Henry's 234, Henry's 270, Henry's 356, S-220, S-235, S-254, S-665, S-670 and S-750, which were all (including Henry's) produced by Armstrong World Industries [Lancaster, Pa.]; V-61, V-66, V-81, which were all produced by Mannington [Salem, N.J.]; FB-1, Ultrafloorbond, FB-600 and FB6-p, which were all produced by Tarkett Inc. [Whitehall, Pa.]; 3044, 3075 and 3080, which were all produced by the Congoleum Corp. [Mercerville, N.J.]. All of these adhesives appeared to be compatible with the coated underlayment surface, although in some cases the applied coating appeared to either slightly increase or slightly decrease the working open time of the adhesive (this is the time period which begins when fresh adhesive is applied to the underlayment and ends when the applied adhesive has dried out or lost its tack and is no longer capable of forming a bond to the vinyl floor sheathing).

In another set of tests Successor Perimeter Attached vinyl floor sheathing from Armstrong World Industries was attached to both coated and uncoated OSB underlayment sections by use of the S-670 adhesive from Armstrong World Industries. The shear strength of the bond developed between the vinyl and the underlayment was measured after 1 day and 7 days of set time. Ten replicates were used for each set of parameters. The shear strength between the uncoated underlayment and the vinyl was 7.10 psi and 7.83 psi after 1 and 7 days, respectively. The shear strength between the coated underlayment and the vinyl was 7.50 psi and 8.05 psi after 1 and 7 days, respectively.

In another set of tests Cambray Fully Adhered vinyl floor sheathing from Armstrong World Industries was attached to both coated and uncoated OSB underlayment sections by use of the S-254 adhesive from Armstrong World Industries. The shear strength of the bond developed between the vinyl and the underlayment was measured after 1 day and 7 days of set time. Ten replicates were used for each set of parameters. The shear strength between the uncoated underlayment and the vinyl was 3.00 psi and 3.99 psi after 1 and 7 days, respectively. The shear strength between the coated underlayment and the vinyl was 3.00 psi and 4.09 psi after 1 and 7 days, respectively.

In another set of tests Argent Perimeter Attached vinyl floor sheathing from Mannington was attached to both coated and uncoated OSB underlayment sections by use of the V-61 adhesive from Mannington. The shear strength of the bond developed between the vinyl and the underlayment was measured after 1 day and 7 days of set time. Ten replicates were used for each set of parameters. The shear strength between the uncoated underlayment and the vinyl was 9.30 psi and 11.5 psi after 1 and 7 days, respectively. The shear strength between the coated underlayment and the vinyl was 9.00 psi and 11.5 psi after 1 and 7 days, respectively.

In another set of tests Life Time Bright Fully Adhered vinyl floor sheathing from Tarkett Inc. was attached to both coated and uncoated OSB underlayment sections by use of the FB-1 adhesive from Tarkett Inc. The shear strength of the bond developed between the vinyl and the underlayment was measured after 1 day and 7 days of set time. Ten replicates were used for each set of parameters. The shear strength between the uncoated underlayment and the vinyl was 4.00 psi and 4.37 psi after 1 and 7 days, respectively. The shear strength between the coated underlayment and the vinyl was 3.60 psi and 4.85 psi after 1 and 7 days, respectively.

An array of staining tests were conducted in which sections of vinyl floor sheathing were stapled to sections of underlayment. The assemblies were then placed in an environmental chamber for a period of eight weeks with the relative humidity maintained at 90% and the temperature maintained at 50° C. The vinyl sections in the assemblies were photographs and inspected for stain formation at one week intervals. Replicates of 10–20 were used for all tests and the vinyl sections in each assembly were assigned a value during each evaluation period that represented the degree of staining associated with it. We have subjected over 6000 assemblies to this test and we have generally observed that the degree of vinyl staining is most severe when the vinyl floor sheathing is thin, the underlayment is not coated with the stain blockers described in this patent application, and the underlayment is composed of wood that contains high concentrations of staining extractives (for instance the cambium layer of the aspen stem has a particularly high concentration of extractives that readily stain a wide array of vinyl floor sheathing products). Uncoated OSB underlayment which severely stained vinyl floor sheathing products; including Successor Perimeter Attached (Armstrong), Cambray Fully Adhered (Armstrong), Sterling Perimeter Attached (Mannington), Omnia Perimeter Attached (Mannington) and Argent Perimeter Attached (Mannington); was either totally or substantially resistant to staining these same vinyl floor sheathing products when the preferred coating was applied to the underlayment by use of the preferred coating procedure.

EXAMPLE 2

A stain blocking formulation was prepared by dispersing Avicel, type RCN-30 from the FMC Corp. [Philadelphia, Pa.] (20 parts by weight), in water (207.7 parts by weight) in a high shear blender for a period of 30 minutes. A diarylide yellow pigment dispersion (2.0 parts by weight), a phthalo blue pigment dispersion (0.2 parts by weight), a carbon black pigment dispersion (0.3 parts by weight) and titanium dioxide powder (40 parts by weight) were added with continued mixing for a 5 minute period. A carboxylated styrene-butadiene latex, known as Tylac 97422-00 from Reichhold Chemicals, Inc. [Dover, Del.] (400 parts by weight), was added with continued mixing for a 5 minute period. A polyvinyl chloride powder, type 179 from The Geon Co. [Cleveland, Ohio] (40 parts by weight) was then added with continued stirring for a 5 minute period. Magnesium hydroxide powder, known as MagChem MH10 from Martin Marietta Magnesia Specialties, Inc. [Baltimore, Md.] (210 parts by weight), was then added to the batch with continued stirring for a 5 minute period. Hard burned magnesium oxide, known as MagChem 10–200 from Martin Marietta Magnesia Specialties, Inc. [Baltimore, Md.] (80 parts by weight) was then added to the batch with continued stirring for a 5 minute period.

This formulation had acceptable rheology and shelf-life stability properties. When it was applied to OSB underlayment samples in a manner that was similar to that described in example 1, the resulting coated product was resistant to staining an array of vinyl floor sheathing products.

EXAMPLE 3

A stain blocking formulation was prepared by dispersing Avicel, type RCN-30 from the FMC Corp. [Philadelphia, Pa.] (16.8 parts by weight), in water (337.2 parts by weight) in a high shear blender for a period of 30 minutes. A polyvinyl acetate latex, known as XB90K5 LF from Borden Inc. [Springfield, Oreg.] (265.3 parts by weight) was added with continued stirring for a 5 minute period. Titanium dioxide powder (61.9 parts by weight) and carbon black powder (0.9 parts by weight) were added with continued stirring for a 5 minute period. Magnesium hydroxide powder, known as MagChem MH10 from Martin Marietta Magnesia Specialties, Inc. [Baltimore, Md.] (265.3 parts by weight), was then added to the batch with continued stirring for a 5 minute period. Hard burned magnesium oxide powder, known as MagChem 10–200 from Martin Marietta Magnesia Specialties, Inc. [Baltimore, Md.] (53.1 parts by weight), was then added to the batch with continued stirring for a 5 minute period.

This formulation had acceptable rheology and a shelf-life of about 1 month when it was stored at a temperature of 20° C. When it was applied to OSB underlayment samples in a manner that was similar to that described in example 1, the resulting coated product was resistant to staining an array of vinyl floor sheathing products.

EXAMPLE 4

A stain blocking formulation was prepared by dispersing Avicel, Type RCN-30 from the FMC Corp. [Philadelphia, Pa.] (23.5 parts by weight), in water (332.7 parts by weight) in a high shear blender for a period 30 minutes. A polyvinyl acetate latex, known as SB90K5 LF from Borden Inc. [Springfield, Oreg.] (58.7 parts by weight) was added with continued stirring for a 5 minute period. A green pigment dispersion (29.4 parts by weight) and titanium dioxide powder (74.4 parts by weight) were added with continued stirring for a 5 minute period. Kaolin (146.8 parts by weight) and boric acid powder (146.8 parts by weight) were added with continued stirring for a 5 minute period. A 50% caustic solution (187.9 parts by weight) was then added with continued stirring for a 5 minute period.

This formulation had acceptable rheology and a shelf-life of about 1 week when it was stored at a temperature of 20° C. When it was applied to OSB underlayment samples at a spread rate of about 24 g/sq. ft. and in a manner that was similar to that described in example 1, the resulting coated product was resistant to staining an array of vinyl floor sheathing products.

EXAMPLE 5

A stain blocking formulation suitable for a painting application was prepared by dispersing Avicel, type RCN-30 from the FMC Corp. [Philadelphia, Pa.] (18 parts by weight), in water (202 parts by weight) in a high shear blender for a period of 30 minutes. Titanium dioxide powder (40 parts by weight) was added with continued mixing for a 5 minute period. A carboxylated styrene-butadiene latex, known as Tylac 97422-00 from Reichhold Chemicals, Inc. [Dover, Del.] (400 parts by weight), was added with continued mixing for a 5 minute period. A polyvinyl chloride powder, type 179 from The Geon Co. [Cleveland, Ohio] (40 parts by weight) was then added with continued stirring for a 5 minute period. Magnesium hydroxide powder, known as MagChem MH10 from Martin Marietta Magnesia Specialties, Inc. [Baltimore, Md.] (300 parts by weight), was then added to the batch with continued stirring for a 5 minute period.

Cedar lumber was cut into 24 sections (1'×1'). These sections were randomized and then divided into two groups of 12 sections each.

The antistaining formulation was applied by use of a brush to 12 sections of the cedar lumber at a spread rate of 20 g/sq. ft. The applied stain blocker was allowed to dry under ambient conditions for about 30 minutes. Exterior Satin Flat Acrylic Latex Ultra White Paint, which was manufactured by the Behr Process Corp. [Santa Ana, Calif.], was applied by use of a brush to the 12 sections of cedar lumber directly on top of the first coat at a spread rate of 12 g/sq. ft. The applied paint was allowed to dry under ambient conditions for about 30 minutes. Another coat of the white paint was then applied to the cedar lumber sections directly on top of the two previous coats at a spread rate of 10 g/sq. ft. The applied paint was allowed to dry under ambient conditions for about 30 minutes. Thus, the total spread rate of wet coating and paint on these experimental boards was 42 g/sq. ft.

The second set of 12 sections of cedar lumber was coated with only the white latex paint. The first coat had a spread rate of 24 g/sq. ft. and the second coat had a spread rate of 20 g/sq. ft. Thus, the total spread of wet white paint was 44 g/sq. ft.

The two sets of painted boards were compared side-by-side and evaluated for severity of staining (these stains appeared to be due to wood extractives that had bled through the paint). In 11/12 comparisons the boards treated with the stain blocker appeared to be whiter and had less severe straining than the control boards. In 1/12 comparisons the experimental and control boards were deemed to be equivalent in whiteness and staining.

Improvements and modifications may occur to those skilled in the art which are not disclosed in the preceding description. All such improvements and modifications are intended to be included within the scope of the following claims.

We claim:

1. A stain blocking formulation for application to a wood-based substrate, comprising an aqueous liquid containing an alkaline magnesium compound selected from the group consisting of magnesium hydroxide, magnesium oxide, and mixtures thereof, and a binder material, wherein the alkaline magnesium compound is present in the formulation in an amount from about 5 to about 45 parts per hundred based on the total weight of the formulation, wherein the binder material secures the alkaline magnesium compound to the substrate, and wherein the formulation has a shelf-life of at least about two months at 20° C.

2. The formulation of claim 1 wherein the binder material comprises a latex.

3. The formulation of claim 2 wherein the latex is selected from the group consisting of acrylic, styrene-butadiene, and polyvinyl acetate latices.

4. The formulation of claim 1 wherein the alkaline magnesium compound is present in about 30 parts per hundred based on the total weight of the formulation.

5. The formulation of claim 1 wherein the binder material is present in an amount from about 5 to about 50 parts per hundred based on the total weight of the formulation.

6. The formulation of claim 1 wherein the binder material is present in about 40 parts per hundred based on the total weight of the formulation.

7. The formulation of claim 1 wherein the alkaline magnesium compound comprises magnesium hydroxide.

8. The formulation of claim 1 wherein the binder material comprises styrene-butadiene latex.

9. The formulation of claim 1 further comprising a viscosifying agent, wherein the viscosifying agent is present in the formulation in an amount up to about 4 parts per hundred based on the total weight of the formulation.

10. The formulation of claim 1 further comprising a pigment, wherein the pigment is present in the formulation in an amount up to about 6 parts per hundred based on the total weight of the formulation.

11. A stain blocking formulation for application to a wood-based substrate, comprising an aqueous liquid containing an alkaline magnesium compound, a binder material, a vicosifying agent, and a pigment, wherein the alkaline magnesium compound is magnesium hydroxide, wherein the magnesium hydroxide is present in the formulation in an amount from about 5 to about 45 parts per hundred based on the total weight of the formulation, wherein the binder material comprises styrene-butadiene latex present in an amount from about 5 to about 50 parts per hundred based on the total weight of the formulation, and wherein the binder material secures the alkaline magnesium compound to the substrate, wherein the viscosifying agent is present in an amount up to about 4 parts per hundred based on the total weight of the formulation, and wherein the pigment is present in an amount up to about 6 parts per hundred based on the total weight of the formulation.

* * * * *